United States Patent
Anthony et al.

(10) Patent No.: US 6,844,026 B2
(45) Date of Patent: Jan. 18, 2005

(54) PREPARATION OF PARTICLES BY HYDROLYSIS OF A METAL CATION IN THE PRESENCE OF A POLYMER

(75) Inventors: Olivier Anthony, Enghien les Bains (FR); Corine Gerardin, Saint Georges D'Orques (FR); Nathalie Cadena, Union City, NJ (US); Marie-Pierre Labeau, Levallois-Perret (FR)

(73) Assignee: Rhodia Chimie, Boulogne Billancourt (FR)

( * ) Notice: Subject to any disclaimer, the term of this patent is extended or adjusted under 35 U.S.C. 154(b) by 472 days.

(21) Appl. No.: 09/781,475

(22) Filed: Feb. 12, 2001

(65) Prior Publication Data

US 2002/0112407 A1 Aug. 22, 2002

(51) Int. Cl.[7] ................................................. B05D 7/00
(52) U.S. Cl. .................... 427/212; 427/213.36; 516/78; 516/89; 516/93; 516/97; 106/287.18
(58) Field of Search .......................... 427/212, 213.36; 516/78, 89, 93, 97; 106/287.18

(56) References Cited

U.S. PATENT DOCUMENTS

| | | | | |
|---|---|---|---|---|
| 5,133,955 A | * | 7/1992 | Raghavan et al. | 423/592.1 |
| 5,336,521 A | * | 8/1994 | Dransfield et al. | 427/220 |
| 6,376,616 B1 | * | 4/2002 | December | 525/278 |
| 6,413,590 B1 | * | 7/2002 | Anderson et al. | 427/385.5 |
| 6,500,871 B1 | * | 12/2002 | Gerardin et al. | 516/89 |

FOREIGN PATENT DOCUMENTS

GB     1055934 A   *   1/1967

* cited by examiner

Primary Examiner—Elena Tsoy

(57) ABSTRACT

A subject matter of the invention is a process for the preparation of particles comprising at least one metal ion, which comprises the stage of bringing into contact a precursor a metal cation, optionally partially hydrolyzed, with at least one water-soluble comb copolymer. Likewise, a subject matter of the invention is particles capable of being prepared according to the process of the invention, said particles exhibiting a mean size of between 2 and 500 nm and preferably between 2 and 300 nm. Finally, it relates to the use of such particles in the mechanical polishing of hard objects, in the preparation of pigments or mixed ceramics for the electronic industry, in the reinforcing of polymeric matrices, in fungicidal or biocidal dispersions, in the scavenging of sulfur derivatives or the scavenging of unpleasant smells.

23 Claims, No Drawings

PREPARATION OF PARTICLES BY HYDROLYSIS OF A METAL CATION IN THE PRESENCE OF A POLYMER

A subject-matter of the present invention is a process for the preparation of inorganic particles by hydrolysis of a compound comprising one or more metal cations and the particles thus obtained.

Compounds in the form of divided solids, whether the latter are divided in the dry form or alternatively in the form of dispersions, are used in numerous fields. This is, for example, the case in the field of plant-protection formulations, where some pesticides are found to be inorganic particles, such as fungicidal copper hydroxide, which forms part of the composition of Bordeaux mixture. Still in this field, plant-protection formulations can comprise nutrient elements in the form of metals. The case may also be found in the field of pigments, where rare earth metal oxides or hydroxides are employed.

One of the problems encountered is to be able to have available particles comprising one metal or several which are chemically stable when they are in the form of a powder but which remain stable when they are in the form of a dispersion. It is therefore advantageous again to cite the case of copper. Thus, the difficulty with this compound is that the hydroxide is first of all relatively difficult to disperse. However, in addition, it exhibits the disadvantage of not being chemically stable over time. This is because copper hydroxide dehydrates more or less rapidly to copper oxide. Furthermore, the control exerted over the growth of copper hydroxide particles during its synthesis is far from being efficient. Consequently, the distribution of the particle sizes is very broad, which can represent a disadvantage during the use of said particles. This is one of the reasons why Bordeaux mixture is very often sold commercially in the form of a powder and not of a suspension; it being possible for the powders to be stored.

Likewise, the particles must be in a position to be able to be easily dispersed, to form dispersions which are sufficiently stable, in particular which do not separate by settling on storage or when they are used.

An object of the present invention is to provide particles in the dry or dispersed form which are chemically stable in both these presentations, which are easily dispersible in an aqueous medium and which give access to dispersions which do not separate by settling on storage.

These aims and others are achieved by the present invention, a first subject matter of which is a process for the preparation of particles comprising at least one metal ion in which the following stages are employed:
a) at least one precursor comprising at least one metal cation is dissolved or dispersed in an aqueous medium;
b) a partial hydrolysis of said precursor is optionally carried out,
c) the precursor resulting from stage a) or the optionally hydrolyzed precursor resulting from stage b) is brought into contact with at least one water-soluble comb copolymer comprising either a complexing anionic backbone and stabilizing hydrophilic side chains or a stabilizing neutral hydrophilic backbone and complexing anionic side chains or at least one of the two abovementioned copolymers in combination with at least one complexing anionic hydrophilic polymer;
d) a partial or complete hydrolysis of the product obtained during stage c) is carried out.

A subject matter of the present invention is likewise the particles capable of being obtained by employing the process according to the invention, the mean size of which is between 2 and 500 nm.

One of the advantages of the present invention is that the process makes it possible to efficiently control the growth of the particles.

Furthermore, because of their preparation process, the particles obtained are easily redispersible. This is because the polymeric coating which they exhibit has the consequence of facilitating the resuspension of said particles.

However, other advantages and characteristics of the present invention will become more clearly apparent on reading the description and examples which will follow.

As has been indicated above, a subject matter of the present invention is first of all a process for the preparation of particles comprising at least one metal ion which comprises the following stages:
a) at least one precursor comprising a metal cation is dissolved or dispersed in aqueous medium;
b) a partial hydrolysis of said precursor is optionally carried out,
c) the precursor resulting from stage a) or the optionally hydrolyzed precursor resulting from stage b) is brought into contact with at least one water-soluble comb copolymer comprising either a complexing anionic backbone and stabilizing hydrophilic side chains or a stabilizing neutral hydrophilic backbone and complexing anionic side chains or at least one of the two abovementioned copolymers in combination with at least one complexing anionic hydrophilic polymer;
d) a partial or complete hydrolysis of the product obtained during stage c) is carried out.

First of all, the precursor comprises at least one metal cation which is chosen more particularly from the metals from columns IIIA, IVA, VIII, IB, IIB, IIIB and VB of the Periodic Table, the lanthanides and the actinides. It is specified that the Periodic Table is that which appeared in the bulletin de sociétés chimiques de France of January 1966.

According to a specific embodiment of the invention, the metal cation is chosen from titanium, iron, cobalt, nickel, copper, aluminum, zinc, gold, silver, platinum, cerium, lanthanum, yttrium, iridium, ruthenium, rhodium, osmium or palladium. These cations being present alone or as mixtures. It should be noted that it is not impossible to employ a mixed precursor and/or a mixture of several precursors comprising only one cation.

A first alternative form of the invention consists in employing the precursor in the form of an aqueous solution. In such a case, the precursor is used in the form of a water-soluble salt. Said salt is preferably chosen from nitrates, sulfates, chlorides, phosphates or their mixtures. The salt or salts can also be chosen from non-polymeric complexing agents, such as citrates, lactates or their mixtures.

A second alternative form of the invention consists in employing said precursor in the form of an aqueous suspension. Said particles are preferably suspended solids. According to this alternative form, the precursor can be composed of particles, of aggregates of particles or of their combination.

According to an advantageous embodiment of the present invention, the particles or the aggregates of particles have a mean size of less than or equal to 100 nm, more particularly of between 2 and 100 nm and preferably of between 2 and 90 nm. The mean size of the particles/aggregates is measured by dynamic light scattering.

In addition, these particles and/or aggregates of particles more particularly comprise a hydroxide, a hydroxide oxide or a partially hydrolyzed water-soluble salt of a metal cation, alone or as mixtures, optionally combined with an oxide of a metal cation. Here again, various possibilities can be envisaged, from the presence of one metal cation present in one form to the presence of several cations in various forms.

Such particles can be obtained by employing processes known to a person skilled in the art.

The aqueous medium in which the salts, or particles, aggregates of particles or water-soluble salts, or their combinations is preferably water. It should be noted that the use of an aqueous medium comprising at least one water-miscible solvent can be envisaged. Mention may in particular be made, by way of illustration, of short alcohols, such as ethanol or isopropyl alcohol.

Once the suspending/dissolving has been carried out, a particularly advantageous embodiment of the present invention consists in employing a partial hydrolysis of the precursor.

Generally, this hydrolysis, if it is carried out, is carried out in the presence of a base chosen from alkali metal or alkaline earth metal hydroxides and aqueous ammonia.

Advantageously, the base is more particularly chosen from sodium hydroxide, potassium hydroxide, calcium hydroxide or aqueous ammonia, alone or as mixtures.

This partial hydrolysis is generally carried out by adding the neutralizing base to the solution/dispersion.

This operation, when it takes place, is conventionally carried out with stirring.

According to an important characteristic of the process of the invention, the precursor obtained after the dissolving/dispersing described during stage a) or the partially hydrolyzed precursor resulting from stage b) is subsequently brought into contact with at least one water-soluble comb copolymer comprising a complexing anionic backbone and stabilizing hydrophilic side chains or a stabilizing neutral hydrophilic backbone and complexing anionic side chains or at least one of the two abovementioned copolymers in combination with at least one complexing anionic hydrophilic polymer.

It is pointed out that the term "complexing" covers not only complexing in the strict sense (shearing of orbitals) but it intends also to cover bonds of ionic type.

In a particularly advantageous way, the polymer employed during stage c) exhibits a weight-average molecular mass (Mw) of between 2 000 and 5×10$^5$ g/mol, preferably of between 3 000 and 10$^5$ g/mol. The weight-average molar mass is usually measured by GPC (polyethylene glycol standard).

According to an advantageous embodiment of the present invention, the polymers, whether they are comb copolymers or hydrophilic polymers, employed in the process according to the invention are chosen from polymers which give a transparent solution in water at the lowest temperature to which said polymer (or said comb and hydrophilic polymers) is subjected during the implementation of the process; the content by weight of polymer(s) in the solution being 50% by weight.

A first embodiment of the invention consists in using at least one water-soluble comb copolymer comprising a complexing anionic backbone and stabilizing hydrophilic side chains which are preferably nonionic hydrophilic chains. According to a preferred embodiment of the invention, the water-soluble comb copolymer comprises a complexing anionic hydrophilic backbone.

Use is preferably made of a copolymer comprising a fraction by weight of nonionic hydrophilic side chains which is greater than the fraction by weight of complexing ionic monomer.

The anionic backbone is more particularly obtained from monomers chosen from unsaturated monocarboxylic acids, polycarboxylic acids or their anhydride form, unsaturated amino acids or unsaturated sulfonic acids.

Mention may be made, as examples of suitable monomers, without intending to be restricted thereto, of:

acrylic acid or methacrylic acid, vinylsulfonic acid, 2-propene-1-sulfonic acid, methallylsulfonic acid, sulfopropyl (meth)acrylate, styrenesulfonic acid or acrylamidomethylpropanesulfonic acid, vinylbenzoic acid, fumaric acid, itaconic acid, citraconic acid, maleic acid, their salts or their anhydrides, vinylphosphonic acid.

It is possible to use, in addition to the abovementioned anionic monomers, water-soluble nonionic monomers: hydroxyalkyl esters of α,β-ethylenically unsaturated acids, such as hydroxyethyl or hydroxypropyl acrylates or methacrylates, acrylamide, and the like.

It is likewise possible to combine the abovementioned monomers with precursors chosen from monomers, the units of which, once incorporated in the polymer chain, can be converted, in particular by a chemical treatment such as hydrolysis, to water-soluble units. They are, for example, tert-butyl (meth)acrylate, inter alia.

The use of hydrophobic monomers is not excluded either. However, if monomers of this type are present, their proportions are such that the comb copolymer, optionally combined with the hydrophilic polymer, forms a transparent solution at 50% by weight in water at the lowest temperature to which said comb copolymer, optionally combined with the hydrophilic polymer, is subjected in the process.

Mention may be made, among hydrophobic monomers which can be used, of, for example, linear or branched hydrocarbonaceous monomers comprising at least one carbon-carbon double bond which comprise 2 to 10 carbon atoms in the longest chain. Mention may be made, by way of examples, of vinylaromatic monomers, such as styrene or vinyltoluene, alkyl acrylates, alkyl methacrylates, acrylamide derivatives, such as N-alkyl- or N,N-dialkylacrylamides or N-alkyl- or N,N-dialkylmethacrylamides, α,β-ethylenically unsaturated nitriles, such as acrylonitrile, α,β-ethylenically unsaturated amides, such as acrylamide, or vinyl ether, such as methyl or ethyl vinyl ether.

The monomers forming the nonionic side chains are chosen more particularly from macromonomer entities. It should be recalled that, within the meaning of the present invention, a macromonomer denotes a macromolecule carrying one or more ethylenically functional groups which can be polymerized by the radical route.

Mention may be made, by way of examples, of macromonomers of poly(ethylene glycol) (meth)acrylate, poly (vinyl alcohol) (meth)acrylate, poly(hydroxy($C_1$-$C_4$)-alkyl (meth)acrylate) (meth)acrylate, poly(N-methylolacrylamide) (meth)acrylate or poly((meth)acrylamide) (meth)acrylate type.

These macromonomers can in particular be obtained, inter alia, by transesterification of methyl acrylate (or methacrylate) or of (meth)acrylic anhydride or of acryloyl or methacryloyl chloride. They can also be obtained by direct esterification of acrylic or methacrylic acid.

Some macromonomers can also be obtained by telomerization, such as those of the poly((meth)acrylamide) (meth)acrylate type.

The monomers forming the nonionic side chains which are preferred in the context of the present invention are poly(ethylene glycol) methacrylates. According to a preferred embodiment, the nonionic side chains exhibit a poly (ethylene glycol) number-average molar mass of between 200 and 10 000 g/mol, preferably between 300 and 2 000 g/mol.

A second embodiment of the invention consists in using a copolymer comprising a stabilizing neutral hydrophilic backbone and complexing anionic side chains. According to a preferred embodiment, the water-soluble comb copolymer comprises complexing anionic hydrophilic side chains.

The neutral hydrophilic backbone is advantageously obtained from ethylene oxide and can be provided in the form of an oligomer or of a polymer.

With regard to the side chains, they can be obtained from monomers chosen from unsaturated carboxylic acids, polycarboxylic acids or their anhydride form, or unsaturated sulfonic acids (nonlimiting examples). Reference may be made to the lists of monomers of this type given in the context of the first embodiment. The monomers employed are preferably chosen from unsaturated carboxylic acids or unsaturated sulfonic acids.

It would not be departing from the scope of this second embodiment to incorporate, among the monomers, water-insoluble monomers or water-soluble nonionic monomers, such as, in particular, those indicated above in the context of the preceding alternative form. Thus, monomers of the type of esters of unsaturated carboxylic acids, which is optionally substituted, such as alkyl or hydroxyalkyl (meth)acrylates, glycidyl (meth)acrylates, sulfopropyl (meth)acrylates or vinyl acetate, can be incorporated. Likewise, linear or branched $C_2$–$C_{10}$ hydrocarbonaceous monomers comprising at least one carbon-carbon double bond, vinylaromatic monomers, $\alpha,\beta$-ethylenically unsaturated nitriles, $\alpha,\beta$-ethylenically unsaturated amides, vinyl ethers, N-vinylpyrrolidone, and the like, can be incorporated.

It should be noted that, if monomers of this type are present, their proportions are such that the comb copolymer, optionally combined with the hydrophilic polymer, forms a transparent solution at 50% by weight in water at the lowest temperature to which said comb copolymer, optionally combined with the hydrophilic polymer, is subjected in the process.

According to a third embodiment of the invention, at least one of the two abovementioned copolymers is employed in combination with at least one complexing anionic hydrophilic polymer.

This polymer can more particularly be obtained by polymerization of at least one anionic monomer chosen from unsaturated carboxylic acids, polycarboxylic acids or their anhydride form, unsaturated amino acids or unsaturated sulfonic acids. Reference may be made to the list of the monomers of this type given above.

Said polymer can be a homopolymer or a copolymer in which the distribution of the monomers is random.

The preparation of polymers of this type is fully known to a person skilled in the art. It takes place under radical conditions, in the aqueous phase, with the use of initiators which are conventional in the field (for example, azobis (cyanovaleric acid) or azobis(methylpropionamide hydrochloride)). (AIBN is not water-soluble.)

More particularly, the weight-average molar mass of the polymer (Mw) [lacuna] between 2 000 and $5 \times 10^5$ g/mol, preferably between 3 000 and $10^5$ g/mol. The weight-average molar mass is usually measured by GPC (polyethylene glycol standard). According to an advantageous alternative form of the invention, the weight-average molar mass of the polymer is less than or equal to that of the comb copolymer with which it is combined.

Furthermore, according to a preferred embodiment of the invention, said polymer is water-soluble. More specifically, it forms a transparent solution at 10% by weight in water at the lowest temperature to which said water-soluble polymer is subjected in the process. Finally, it also forms a transparent solution in water under the same temperature conditions when it is combined with the comb copolymer.

In the context of this specific alternative form of the invention, the content of polymer with respect to that of the comb copolymer with which it is combined is between 1% and 1 000%.

The comb polymers of the first and second embodiment of the invention which have just been described are well known to a person skilled in the art. They can be obtained by various methods, such as, for example, copolymerization of a monomer of anionic type with a nonionic monomer or macromonomer or alternatively by polymerization or a monomer of anionic type, followed by grafting of nonionic chains.

The grafting of the side polymeric segments onto a backbone polymeric segment can be carried out according to conventional techniques familiar to a person skilled in the art (European Polymer Journal, 4, 343 (1968), for example).

Mention may in particular be made, among these conventional techniques, of those referred to as direct grafting and polymerization.

Direct grafting consists in polymerizing the chosen monomer(s) by the radical route in the presence of the polymer selected to form the backbone of the final product. If the monomer/backbone pair and the operating conditions are carefully chosen, then there may be a transfer reaction between the growing macroradical and the backbone. This reaction creates a radical on the backbone and it is from this radical that the graft grows. The primary radical resulting from the initiator can also contribute to the transfer reactions.

For its part, the copolymerization employs, in a first step, the grafting to the end of the nonionic segment of a functional group which can be polymerized by the radical route. This grafting can be carried out by conventional organic chemistry methods. Then, in a second step, the macromonomer thus obtained is polymerized with the monomer chosen to form the backbone and a polymer referred to as a "comb" polymer is obtained.

It is obvious to a person skilled in the art that, when a macromonomer and a monomer, chosen so that these two entities are strongly combined by hydrogen bonds, are polymerized, then there is simultaneously direct grafting to the polymeric segment of the macromonomer and incorporation of this macromonomer in the polymer chain by simple polymerization of its polymerizable end. In this case, the structure obtained is substantially more branched or even crosslinked than in the two preceding cases.

Whatever the method chosen, the polymerization and the grafting preferably take place in the aqueous phase.

In addition, it is advantageously carried out in the presence of a polymerization initiator, preferably a water-soluble polymerization initiator. The latter can be chosen in particular from peroxides, such as alkali metal or ammonium persulfates, azobis(cyanovaleric acid), azobis (methylpropionamide hydrochloride), and the like.

In the case of polymers which exhibit a nonionic backbone and anionic side chains, it is possible to proceed, for example, by radical polymerization, again preferably in the aqueous phase, of monomers of anionic type, from which the grafts derive, with an oligomer or polymer deriving from ethylene oxide.

The polymerization operation is carried out in the presence of a polymerization initiator which is preferably water-soluble. Mention may be made, among initiators which can be envisaged, by way of examples, of peroxides, such as alkali metal or ammonium persulfates, initiators of azo type, such as 2,2'-azobis[2-methyl-N-(2-hydroxyethyl) propionamide] or 4,4'-azobis(4-cyanovaleric acid), or redox systems based on an oxidizing agent, such as aqueous hydrogen peroxide solution or alkali metal persulfates, and on reducing agents, such as alkali metal bisulfites.

The temperature at which the polymerization is carried out can vary within wide limits. By way of illustration, the reaction is carried out between 60 and 100° C.

Stage c), corresponding to bringing the solution/dispersion obtained after stage a) or b) into contact with the copolymer, is preferably carried out with stirring.

The amount of copolymer, optionally in combination with the homopolymer, is such that the molar ratio of the complexing group of the complexing anionic hydrophilic part(s) to the number of mole of the metal cation present in the precursor is advantageously between 0.05 and 10, more particularly between 0.1 and 1. It should be pointed out that, generally, the higher this molar ratio, the smaller the size of the particles obtained on conclusion of the process according to the invention.

Once homogenization has been carried out, a hydrolysis stage (stage d)) is carried out.

This stage consists in bringing a base into contact with the mixture obtained in the preceding stage. More particularly, the base is added to the mixture of stage d), preferably with stirring.

Generally, the hydrolysis of stage d) is itself also carried out in the presence of a base chosen from alkali metal or alkaline earth metal hydroxides and aqueous ammonia. The base is preferably chosen from sodium hydroxide, potassium hydroxide, calcium hydroxide or aqueous ammonia, alone or as a mixture.

It should be noted, and this constitutes an additional advantage of the process according to the invention, that the hydrolysis carried out during this stage d) can result in a completely or incompletely hydrolyzed compound being obtained. This is because it may be advantageous in some fields of application to have available particles which are not completely hydrolyzed.

In the case where hydrolysis is complete, in other words when the total amount of base introduced during stages b) (if it takes place) and d) corresponds at least to the charge of the metal cation or cations, the resulting particles comprise an oxide, hydroxide and/or hydroxide oxide.

The amount of base employed during stage b), if it takes place, and during stage d) usually corresponds to 50 to 130% of the stoichiometric amount needed to completely hydrolyze the precursor, preferably from 70 to 100% of the stoichiometric amount. Preferably, in many scenarios, it is preferable to employ a total amount of base corresponding substantially to the stoichiometry.

According to a more specific embodiment of the invention, if n1 is non zero and represents the number of moles of base employed during stage b), n2 represents the number of moles of base employed during stage d) and n represents the sum of n1 and n2, then n1 and n2 conform to the following inequalities $0 < n1 \leq 0.8n$, preferably $0.3 \leq n1 \leq 0.6$, and $0.2n \leq n2 < n$, preferably $0.4 \leq n2 \leq 0.7$.

It should be remembered that n corresponds to the number of moles of base required to result either in partial hydrolysis or in complete hydrolysis (with or without excess base) of the precursor.

In addition, it should be noted that the size of the particles obtained after stage d) can be modified according to the degree of hydrolysis during stage b), if it takes place. Thus, the higher n1, the greater the size of the particles resulting from stage d).

According to an embodiment of the present invention, stages a) to d) are carried out in an aqueous medium with a pH which is preferably adjusted to between 5 and 12, preferably at a pH at least equal to the pKa of the anionic component or components of the comb copolymer.

The temperatures employed during stages a) to d) can be determined without difficulty by a person skilled in the art. They are conventionally between 0° C. and the boiling temperature of the aqueous medium (usually in the vicinity of 100° C.). More particularly, the temperature is between 10 and 50° C., preferably between 20 and 50° C. Advantageously, the temperature is close to ambient temperature. The temperature may or may not be kept constant during stages a) to d).

On conclusion of this hydrolysis stage d), particles are obtained which are found more particularly in the form of colloids.

Advantageously, the size, moreover, of at least 80% by weight of said particles is between 2 and 500 nm, preferably between 2 and 200 nm.

According to a specific embodiment of the invention, an additional stage of maturing of the colloidal dispersion can be carried out after the hydrolysis stage d).

The temperature at which this additional stage e) is carried out is generally between 20° C. and a temperature less than or equal to the boiling point of said dispersion.

Optionally, after stage d) or after stage e), if it takes place, the process according to the invention can comprise an additional stage f) of concentration of the dispersion. This additional concentration stage can be carried out in particular by partially or completely separating the particles from the medium of the dispersion and then optionally by redispersing the particles thus obtained in an appropriate amount of aqueous medium.

More particularly, the separation stage can be carried out by ultrafiltration, dialysis, precipitation (generally by means of a poor solvent or non-solvent for the polymer(s)), centrifugation or ultracentrifugation, by complete or partial evaporation, with or without heating, of the aqueous medium of the dispersion, or by lyophilization, it being possible for these stages to be carried out alone or in combination.

A subject matter of the present invention is likewise the particles capable of being obtained by the process according to the invention, said particles exhibiting a mean size of between 2 and 500 nm and preferably between 2 and 300 nm. The size is measured by dynamic light scattering.

These particles exhibit the advantage, once dried, of being able to be easily redispersed in an aqueous medium. Without wishing to be restricted by a specific theory, the particles, because of their process of preparation, are coated with the polymer. This coating is an aid to the redispersion.

Mention may be made, among possible applications for the colloidal systems prepared by the process according to the invention, of the mechanical polishing of hard objects, such as metal components, the preparation of pigments or mixed ceramics for the electronics industry, the reinforcing of polymeric matrices, fungicidal or biocidal dispersions, and the scavenging of sulfur derivatives and more generally the scavenging of unpleasant smells.

The following examples illustrate the invention without limiting the scope thereof.

EXAMPLE 1

The object of this example is the synthesis of a comb copolymer with the acrylic acid/poly(ethylene glycol) methacrylate (molar ratio: 88/12) theoretical composition.

The copolymerization of acrylic acid and of PEG methacrylate is carried out by the radical route in ethanol, with azobis(isobutyronitrile) (AIBN) (1.6 molar % with respect to the monomers) as initiator, as follows:

The following:
- 115.14 g of ethanol
- 0.2444 g of AIBN
- 5.87 g of acrylic acid
- 23.45 g of PEG-2000 methacrylate (Laporte), dissolved in 37.05 g of water, are introduced, at 25° C. under nitrogen, into a 500 ml three-necked round-bottomed flask equipped with a magnetic rod, with a nitrogen inlet and with an oil bath.

The temperature is subsequently brought to 75° C. It is maintained at 75° C. for 6 and a half hours.

The ethanol is subsequently removed under vacuum at 45° C. (rotary evaporator) and then the product is dissolved in water (concentration by mass: 32.67%).

The weight-average molar mass is 3 6000 g/mol. It is determined by aqueous GPC at ambient temperature (Shodex columns, water/acetonitrile 80/20 w/w, PEG standardization, marker: ethylene glycol). The polydispersity index (PI) is approximately 2.3 (it represents the ratio of the mass-average molar mass to the mass molar mass at the tip).

The polymer is subsequently purified by dialysis against pure water for 7 days in a dialysis bag with a cutoff threshold of 3 500 daltons.

Finally, the polymer is lyophilized.

The final composition of the polymer is subsequently determined by acid/base titration of a 1% by weight solution of copolymer with 0.05M NaOH.

The result is as follows: 13% by weight of acrylic acid and 87% by weight of PEG methacrylate.

EXAMPLE 2

The object of this example is the preparation of a colloidal suspension, stabilized by a comb copolymer, of partially hydrolyzed copper chloride.

3 ml of an $8 \times 10^{-3}$M aqueous $CuCl_2$ solution are poured into a beaker.

0.150 ml of a 0.2M aqueous sodium hydroxide solution is subsequently added with magnetic stirring.

Stirring of the solution is continued for 10 minutes.

The degree of prehydrolysis of the copper is then OH/Cu=1.25.

0.110 ml of a 4.97% by weight solution of comb copolymer obtained in Example 1, after having adjusted the pH of the copolymer solution to 5.3, is added with stirring.

The acrylic acid/Cu molar ratio is 0.4.

1.24 ml of Millipore water are subsequently added with magnetic stirring.

The molar concentration of copper is $5.33 \times 10^{-3}$M.

The suspension obtained is blue and slightly cloudy, and its pH is 5.4.

The hydrodynamic radius of the particles, measured by dynamic light scattering, is 108 nm.

EXAMPLE 3

This example relates to the preparation of a colloidal suspension, stabilized by a comb copolymer, of copper hydroxide.

3 ml of an $8 \times 10^{-3}$M aqueous $CuCl_2$ solution are poured into a beaker.

0.150 ml of a 0.2M aqueous sodium hydroxide solution is subsequently added with magnetic stirring.

Stirring of the solution is continued for 10 minutes.

The degree of prehydrolysis of the copper is then OH/Cu=1.25.

0.110 ml of a 4.97% by weight solution of comb copolymer obtained in Example 1, after having adjusted the pH of the copolymer solution to 5.3, is added with stirring.

The acrylic acid/Cu molar ratio is 0.4.

0.090 ml of a 0.2M aqueous [lacuna] solution is subsequently added with magnetic stirring.

Stirring of the solution is continued for 5 minutes.

The final degree of hydrolysis of the copper is then OH/Cu=2.0.

1.25 ml of Millipore water are subsequently added with magnetic stirring.

The dispersion thus obtained is blue and slightly cloudy. The molar concentration of copper is $5.33 \times 10^{-3}$M and the pH is 7.8 after 9 days.

The hydrodynamic radius of the particles, measured by dynamic light scattering, is 108 nm.

EXAMPLE 4

The object of this example is the preparation of a colloidal suspension, stabilized by a comb copolymer, of copper hydroxide at a higher concentration.

3 ml of a $4 \times 10^{-2}$M aqueous $CuCl_2$ solution are poured into a beaker.

0.155 ml of a 0.96M aqueous sodium hydroxide solution is subsequently added with magnetic stirring.

Stirring of the solution is continued for 10 minutes.

The degree of prehydrolysis of the copper is then OH/Cu=1.25.

0.67 ml of a 4.97% by weight solution of comb copolymer obtained in Example 1, after having adjusted the pH of the copolymer solution to 5.3, is added with stirring.

The acrylic acid/Cu molar ratio is 0.5.

0.094 ml of a 0.96M aqueous [lacuna] solution is subsequently added with magnetic stirring.

Stirring of the solution is continued for 5 minutes.

The final degree of hydrolysis of the copper is then OH/Cu=2.0.

0.58 ml of Millipore water is subsequently added with magnetic stirring.

The dispersion thus obtained is blue and cloudy.

The molar concentration of copper is $2.67 \times 10^{-2}$M and the pH is 9.4 after 6 days.

The hydrodynamic radius of the particles, measured by dynamic light scattering, is 95 nm.

EXAMPLE 5

This example illustrates the drying and the redispersion of a colloidal suspension, stabilized by a comb copolymer, of copper hydroxide.

4.5 ml of a copper hydroxide suspension synthesized according to the procedure described in Example 3 are dried in a beaker for at least 12 hours in a laminar-flow hood without heating.

4 ml of Millipore water are subsequently added to the dried particles with magnetic stirring.

The hydrodynamic radius of the particles, measured by dynamic light scattering after stirring for 10 minutes, is 135 nm instead of 115 nm before drying. The difference between the two values is within the range of error of the technique and shows that there is no aggregation.

EXAMPLE 6

This example illustrates the drying and the redispersion of a more concentrated colloidal suspension, stabilized by a comb copolymer, of copper hydroxide.

21 ml of a copper hydroxide suspension synthesized according to the procedure described in Example 3 are dried in a beaker for at least 12 hours in a laminar-flow hood without heating.

1 ml of Millipore water is subsequently added to the dried particles with magnetic stirring.

The final concentration of copper is thus 21 times higher than before the drying stage.

The hydrodynamic radius of the particles, measured by dynamic light scattering after stirring for 10 minutes, is 124 nm instead of 115 nm before drying.

What is claimed is:

1. A process for the preparation of particles comprising at least one metal ion which comprises the following stages:
   a) at least one precursor comprising a metal cation is dissolved or dispersed in an aqueous medium;
   b) a partial hydrolysis of said precursor is optionally carried out,
   c) the precursor resulting from state a) or the partially hydrolyzed precursor resulting from stage b) is brought into contact with at least one water-soluble comb copolymer comprising a complexing anionic hydrophilic backbone and nonionic stabilizing hydrophilic side chains or a combination of said comb copolymer with at least one complexing anionic hydrophilic polymer; the water-soluble comb copolymer, optionally combined with the water-soluble polymer, is chosen so that the comb copolymer, optionally combined with the hydrophilic polymer, forms a transparent solution at 10% by weight in water at a temperature which is the lowest temperature to which said comb copolymer, optionally combined with the hydrophilic polymer, is subjected in said process, said backbone being obtained from monomers chosen from unsaturated monocarboxylic acids, unsaturated polycarboxylic acids or their anhydride form, or unsaturated sulfonic acids, optionally in combination with one or more water-insoluble monomers, the monomers forming the nonionic side chains are macromonomer entities selected from the group consisting of macromonomers of poly(ethylene glycol) (meth)acrylate, poly(vinyl alcohol) (meth)acrylate, poly(hydroxy($C_1$-$C_4$)alkyl (meth)acrylate) (meth)acrylate, poly(N-methylolacrylamide) (meth)acrylate and poly((meth)acrylamide) (meth)acrylate); and
   d) a partial or complete hydrolysis of the product obtained during stage c) is carried out, then
   e) optionally, a stage of maturing is further carried out at a temperature of between 10° C. and a temperature of less than or equal to the boiling point of said dispersion,
   f) optionally, after stage d) or after stage e), a stage of concentration of the dispersion is carried out, and
   g) the particles having a mean size of between 2 and 500 nm are recovered.

2. A process according to claim 1, wherein the metal cation is selected from the group consisting of metals from Columns IIIA, IVA, VIII, IB, IIB, IIIB and VB of the Periodic Table, the lanthanides and the actinides.

3. A process according to claim to claim 2, wherein the metal cation is selected from the group consisting of titanium, iron, cobalt, nickel, copper, aluminum, zinc, gold, silver, platinum, cerium, lanthanum, yttrium, iridium, ruthenium, rhodium, osmium, and palladium.

4. A process according to claim 1, wherein the precursor is in the form of an aqueous solution of a water-soluble salt of a metal cation selected from the group consisting of nitrates, sulfates, chlorides, and phosphates.

5. A process according to one of claim 4, wherein the precursor is in the form of an aqueous dispersion of particles or of aggregates of particles comprising a hydroxide, a hydroxide oxide or a partially hydrolyzed water-soluble salt of a metal cation, optionally combined with an oxide of a metal cation.

6. A process according to the claim 5, wherein the particles or the aggregates have a mean size of less than or equal to 100 nm.

7. A process according to the claim 6, wherein the particles or the aggregates have a mean size of between 2 and 100 nm.

8. A process according to claim 1, wherein the hydrolyses of stage b) and that of stage d) are carried out in the presence of a base which is an alkali metal hydroxide, an alkaline earth metal hydroxide, or aqueous ammonia.

9. A process according to claim 8, wherein the base is chosen from sodium hydroxide, potassium hydroxide, calcium hydroxide or aqueous ammonia, alone or as mixtures.

10. A process according to claim 1, wherein the base employed during optional stage b), and during stage d) corresponds to 50 to 130% of a stoichiometric amount needed to completely hydrolyze the precursor.

11. A process according to claim 10, wherein, if n1 is non zero and represents the number of moles of base employed during stage b), n2 represents the number of moles of base employed during stage d) and n represents the sum of n1 and n2, then n1 and n2 conform to the following inequalities $0 < n1 \leq 0.8n$ and $0.2n \leq n2 < n$.

12. A process according to claim 1, wherein the water-soluble comb copolymer has a weight-average molecular mass (Mw) of between 2 000 and $5 \times 10^5$ g/mol.

13. A process according to claim 1, wherein the nonionic side chains exhibit a poly(ethylene glycol) number-average molar mass of between 200 and 10 000 g/mol.

14. A process according to claim 1, wherein the monomers forming the complexing anionic backbone or the complexing anionic side chains are combined with, or partially substituted by, esters of unsaturated carboxylic acids, optionally carrying a sulfonated group or a hydroxyl group; esters of unsaturated carboxylic acid; linear or branched hydrocarbonaceous monomers comprising at least one carbon-carbon double bond which comprise 2 to 10 carbon atoms in the longest chain; vinylaromatic monomers; α,β-ethylenically unsaturated nitriles; α,β-ethylenically unsaturated amides; vinyl ether; or N-vinylpyrrolidone.

15. A process according to one of claim 14, wherein the copolymer is combined with at least one polymer obtained by polymerization of at least one anionic monomer which are unsaturated carboxylic acids, polycarboxylic acids or their anhydride form, or unsaturated sulfonic acids.

16. A process according to claim 15, wherein the polymer has a weight-average molar mass of between 2 000 and $5 \times 10^5$ g/mol.

17. A process according to claim 1, wherein of at least 80% of the particles obtained at the end of stage d) have a mean size between 2 and 500 nm.

18. A process according to claim 1, wherein, after stage d), a stage e) of maturing is further carried out at a temperature of between 10° C. and a temperature of less than or equal to the boiling point of said dispersion.

19. A process according to claim 18, wherein, after stage d) or after stage e), a stage f) a concentration of the dispersion is carried out.

20. A process according to claim 19, wherein the concentration is carried out by partially or completely separating the particles from the medium of the dispersion and then optionally by redispersing the particles thus obtained in an appropriate amount of aqueous medium.

21. A process according to claim 20, wherein the separation stage is carried out is by ultrafiltration, dialysis, precipitation, centrifugation, ultracentrifugation, complete or partial evaporation, with or without heating, of the aqueous medium of the dispersion.

22. A process according to claim 1, wherein the mean size of the recovered particles is of between 2 and 300 nm.

23. A process according to claim 22, wherein the mean size of the recovered particles is of between 2 and 90 nm.

* * * * *